United States Patent
Lim et al.

(10) Patent No.: US 8,948,686 B2
(45) Date of Patent: Feb. 3, 2015

(54) METHOD FOR SELECTING SOURCE TRANSMIT ANTENNA IN COOPERATIVE MIMO COMMUNICATION SYSTEM

(75) Inventors: Dae Woon Lim, Seoul (KR); Dong-Joon Shin, Seoul (KR); Jong-Seon No, Seoul (KR); Xianglan Jin, Seoul (KR)

(73) Assignee: Dongguk University Industry-Academic Cooperation Foundation, Seoul (KR)

( * ) Notice: Subject to any disclaimer, the term of this patent is extended or adjusted under 35 U.S.C. 154(b) by 244 days.

(21) Appl. No.: 13/294,406

(22) Filed: Nov. 11, 2011

(65) Prior Publication Data

US 2012/0184232 A1      Jul. 19, 2012

(30) Foreign Application Priority Data

Jan. 14, 2011    (KR) .................. 10-2011-0004243

(51) Int. Cl.
    *H04W 88/08*    (2009.01)
    *H04B 7/14*     (2006.01)
    *H04B 7/06*     (2006.01)
    *H04B 7/15*     (2006.01)
    *H04B 7/02*     (2006.01)
    *H04B 7/04*     (2006.01)

(52) U.S. Cl.
    CPC .............. *H04B 7/0691* (2013.01); *H04B 7/15* (2013.01); *H04B 7/024* (2013.01); *H04B 7/0413* (2013.01)

USPC .............. 455/7; 455/101; 455/129; 455/272

(58) Field of Classification Search
    None
    See application file for complete search history.

(56) References Cited

U.S. PATENT DOCUMENTS

| | | | |
|---|---|---|---|
| 2009/0003416 A1 | 1/2009 | Yu et al. | |
| 2009/0116419 A1* | 5/2009 | Chong et al. | ............. 455/3.01 X |
| 2009/0268657 A1 | 10/2009 | Alexiou et al. | |
| 2011/0188586 A1* | 8/2011 | Bidigare et al. | ......... 455/13.1 X |

FOREIGN PATENT DOCUMENTS

| | | |
|---|---|---|
| KR | 2006 0081755 A | 7/2006 |
| KR | 2008 0113946 A | 12/2008 |

OTHER PUBLICATIONS

Jin, X. et al., *Relay Selection Scheme for Decode-and-Forward Protocol With Multiple Relays*, 20$^{th}$ Telecommunication Information Symposium, vol. 20, Apr. 28-30, 2009.

* cited by examiner

*Primary Examiner* — Philip Sobutka
(74) *Attorney, Agent, or Firm* — Alston & Bird LLP

(57) ABSTRACT

Disclosed is a method for selecting a source transmit antenna in a cooperative multiple-input and multiple-output (MIMO) communication system including a source node, a relay node and a destination node. The method includes determining a source transmit antenna selection metric such that a source-destination channel, a source-relay channel and a relay-destination channel are related to one another, and selecting a positive integer number of antennas such that the source transmit antenna selection metric is maximized.

12 Claims, 5 Drawing Sheets

METHOD FOR SELECTING SOURCE TRANSMIT ANTENNA IN COOPERATIVE MIMO COMMUNICATION SYSTEM

CROSS-REFERENCE TO RELATED APPLICATIONS

This application claims priority under 35 U.S.C. §119 to Korean Patent Application No. 10-2011-0004243, filed on Jan. 14, 2011, in the Korean Intellectual Property Office, the disclosure of which is incorporated herein by reference in its entirety.

BACKGROUND

1. Field of the Invention

The present invention relates to a method for selecting a source transmit antenna in a cooperative multiple-input and multiple-output (MIMO) communication system. More particularly, the present invention relates to a method for selecting a source transmit antenna in a cooperative MIMO communication system for transmitting a signal from a source node to a destination node through a relay node and a computer-readable medium for recording the method thereon.

2. Description of Related Art

In recent years, much research on cooperative communication systems has been conducted to improve the spectral efficiency and reliability of communication systems. The spectral efficiency and reliability of a communication system may be significantly improved by applying multiple-input and multiple-output (MIMO) technology to the cooperative communication system. MIMO refers to an antenna system which enables multiple inputs and multiple outputs. Specifically, MIMO technology allows a base station and a mobile terminal to have two or more antennas to transmit data in multiple paths and allows a receiver to detect signals received in multiple paths, thereby reducing interference and lowering transmission rates.

A conventional wireless communication network, such as a wireless LAN, uses only one of two antennas according to the direction of an access point (AP) configured to connect a wired network with a wireless network. However, MIMO enables two antennas to be operated at the same time for high-rate data exchange. MIMO allows N transmit antennas to transmit independent signals with the same frequency at the same time. As the signals experience different spatial fading on wireless channels, the signals received by receive antennas are not correlated with one another. In this case, since the transmit antennas transmit different signals, data as much as the number of the transmit antennas may be transmitted, thereby transmitting more data than a conventional communication network. For reference, fading is deviation of the attenuation that a carrier-modulated telecommunication signal experiences over certain propagation media.

On the other hand, a multi-antenna source node may obtain a large diversity with a space-time code. However, the use of space-time code needs highly priced RF chains as many as the number of multiple antennas. The RF chain is known to be costly in terms of size, power consumption and hardware. In order to reduce the costs, a conventional point-to-point MIMO system employs a transmit antenna selection technique which is lower in terms of cost and complexity.

Unlike the point-to-point MIMO system, the cooperative communication system has two independent paths, i.e., source-destination node path and source-relay-destination node path. In order to select an improved transmit antenna at a source node, both the source-destination node path and the source-relay-destination node path have to be considered simultaneously. Unlike amplify-and-forward (A&F) relaying technique, however, decode-and-forward (D&F) relaying technique is difficult to derive an accurate signal-to-noise (SNR), making it difficult to find a transmit antenna selection technique.

SUMMARY OF THE INVENTION

The present invention is directed to providing an accurate performance standard in selecting a source transmit antenna in a cooperative communication system, to improving a lowered transmit performance due to an inappropriate selection technique derived from an inaccurate standard, and to preventing any restriction of extension to a multi-relay system due to restriction on the number of selected transmit antennas.

According to an aspect of the present invention, there is provided a method for selecting a source transmit antenna in a cooperative multiple-input and multiple-output (MIMO) communication system including a source node, a relay node and a destination node, the method including: setting a source transmit antenna selection metric such that a source-destination channel, a source-relay channel and a relay-destination channel are related to one another; and selecting a positive integer number of antennas such that the source transmit antenna selection metric is maximized.

The source transmit antenna selection metric may be set using a minimum value of a sum of square of each element of channels formed from a source node antenna and receive antennas of a destination node, a minimum value of a sum of square of each element of channels formed from a source node antenna and receive antennas of a relay node, and a minimum value of a sum of square of each element of channels formed from a relay node antenna and receive antennas of a destination node.

The selecting of a positive integer number of antennas may include selecting antennas as many as a number of RF chains from among antennas included in the cooperative MIMO communication system such that an upper limit of pairwise error probability of a decode-and-forward cooperative communication system may be minimized.

The upper limit of pairwise error probability may have a negative exponent, and when the source transmit antenna selection metric is maximized, the negative exponent may be maximized and the upper limit of pairwise error probability may be minimized.

According to another aspect of the present invention, there is provided a computer-readable recording medium recording a program for implementing the method for selecting a source transmit antenna on a computer.

Other features will become apparent to those skilled in the art from the following detailed description, which, taken in conjunction with the attached drawings, discloses exemplary embodiments of the invention.

DETAILED DESCRIPTION

Prior to the explanation of exemplary embodiments of the invention, environments and related technologies for implementing the present embodiments of the invention will be briefly described.

A typical source transmit antenna selection method considers either a source-destination node channel or a source-relay node channel instead of considering both of them at the same time. That is, if only one of antennas has to be selected, either an antenna with an optimum source-relay node channel or an antenna with an optimum source-destination node channel is selected.

Further, if two transmit antennas have to be selected, two antennas with optimum source-relay node channels, two antennas with optimum source-destination node channels, or one antenna with an optimum source-destination node channel and the other antenna with an optimum source-relay node channel are selected.

However, since the conventional source transmit antenna selection method is not performed based on such a specific performance standard as a minimized error probability or a maximized channel capacity, the transmission performance is not always high.

Further, since the conventional source transmit antenna selection method is only applied when one or two transmit antennas are selected, there is a limitation on the number of selected transmit antennas, making it impossible to apply the conventional method to a multi-relay system. Accordingly, an improved source transmit antenna selection method which may be applied to a general multi-relay system regardless of the number of transmit antennas needs to be introduced.

The following embodiment of the invention concerns a source transmit antenna selection method which is related to a transmission technology of source and relay nodes as well as source-destination node channels, source-relay node channels and relay-destination node channels that are obtained from an upper limit of pairwise error probability in a decode-and-forward cooperative communication system. The present embodiment will be described with reference to the accompanying drawings.

Figure 1:
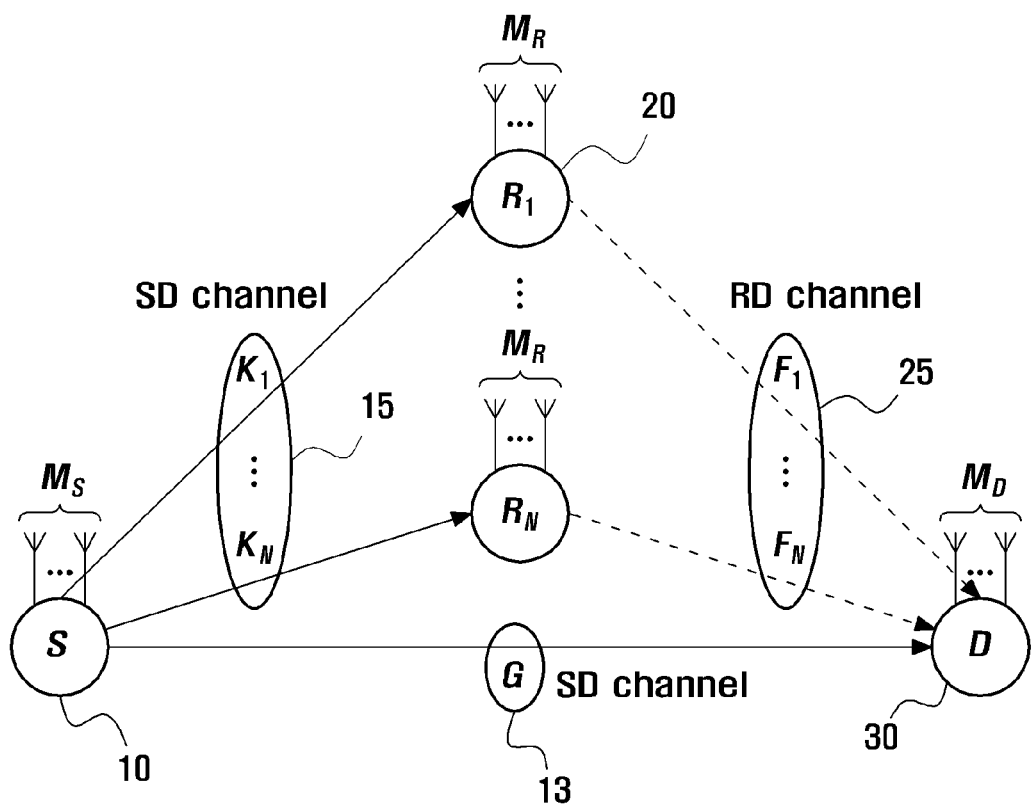
FIG. 1 illustrates a cooperative MIMO communication system for implementing exemplary embodiments of the invention.

FIG. 1 illustrates a cooperative MIMO communication system for implementing exemplary embodiments of the invention. Symbols used herein will first be described.

In the following expressions, a capital letter denotes a matrix and $\|\cdot\|$ denotes Frobenius norm which is the sum of the square of each element in the matrix.

Referring to FIG. 1, S, R and D indicate a source node 10, a relay node 20 and a destination node 30, respectively; $M_S$, $M_R$ and $M_D$ indicate the number of antennas at the source node, the relay node, and the destination node, respectively; $K_1, \ldots, K_N$ indicate a fading channel matrix 15 from the source node to N relay nodes; $F_1, \ldots, F_N$ indicate a fading channel matrix 25 from N relay nodes to the destination node; G indicates a fading channel matrix 13 from the source node to the destination node.

Suppose that the source node transmits a code word $X_S(x)$ to the relay nodes and the destination node for a first time slot and the relay nodes decode the signal from the source node for a second time slot and transmit a code word $X_R(x_{Ri})$ to the destination node using an orthogonal channel.

In a decode-and-forward cooperative communication system, an upper limit of pairwise error probability of signal vectors X and $\tilde{X}$ is expressed by Expression 1:

$$P(x \to \tilde{x}) \le 2(M^L + 1)^N \exp\left(-\frac{1}{4\sigma^2} P_S \|G(X_S(x) - X_S(\tilde{x}))\|^2\right) \quad (1)$$

$$\exp\left(-\frac{1}{4\sigma^2} \sum_{i=1}^{N} \min \begin{bmatrix} \frac{P_S}{2} \min_{\check{x}, \check{x} \ne x} \|K_i(X_S(x) - X_S(\check{x}))\|^2, \\ P_R \min_{\check{x}, \check{x} \ne x} \|F_i(X_R(x) - X_R(\check{x}))\|^2 \end{bmatrix}\right)$$

In Expression 1, $P_S$ denotes an average transmit power of a source node; $P_R$ denotes an average transmit power of a relay node; $X_S$ denotes a code word; $G^j$ denotes a source-destination channel; $K^j$ denotes a source-relay channel; F denotes a source-destination channel. The derivation and proof of Expression 1 are discussed in "Relay Selection Technology of Decode-and-Forward Based Multi-Relay Cooperative Communication Network" by Hyang-ran Kim, Dong-sup Jin, Jong-seon Noh and Dong-jun Shin ($20^{th}$ Telecommunication Information Symposium, Vol. 20, Apr. 28 to Apr. 30, 2009).

As explained above, the exemplary embodiment of the invention describes a source antenna selection method that is related to a source-relay node channel and a relay-destination node channel as well as a source-destination node channel and a method for reducing a pairwise error probability of Expression 1 as a standard for the source antenna selection. In order to lower the pairwise error probability of Expression 1, the upper limit of the pairwise error probability of Expression 1 has to be lowered. This may be achieved by features of Expression 1, which will be described with reference to FIG. 1 and Expression 2.

Suppose that $M_A$ antennas are selected from among $M_S$ transmit antennas of the source node 10 in the system of FIG. 1. Matrix $K_i^{(j)}$ denotes channels formed from the selected source antenna set j and receive antennas of i-th relay node, and matrix $G^{(j)}$ denotes channels formed from the source antenna set j and receive antennas of the destination node 30. In this case, source transmit antenna selection metric $\Gamma_j$ for possible source antenna sets is defined by Expression 2:

$$\Gamma_j = P_S \min_{\check{x}, \check{x} \ne x} \|G^{(j)}(X_S(x) - X_S(\check{x}))\|^2 + \quad (2)$$

$$\sum_{i=1}^{N} \min \begin{bmatrix} \frac{P_S}{2} \min_{\check{x}, \check{x} \ne x} \|K_i^{(j)}(X_S(x) - X_S(\check{x}))\|^2, \\ P_R \min_{\check{x}, \check{x} \ne x} \|F_i(X_R(x) - X_R(\check{x}))\|^2 \end{bmatrix}$$

It can be seen from Expression 2 that the number of possible antenna sets is $$N_S = \binom{M_S}{M_A}$$

if $M_A$ antennas are selected from among $M_S$ source transmit antennas, and the upper limit of pairwise error probability derived from Expression 1 is minimized and an error probability is thus decreased if the antenna set $\hat{j}=\text{argmax}_{j=1,\ldots,N_S}\Gamma_j$ to maximize the source transmit antenna selection metric $\Gamma_j$ is selected. Accordingly, in order to minimize the upper limit of pairwise error probability of Expression 1, an antenna of the source node with a maximum negative exponent in Expression 1 has to be selected. In this case, the matrices $G^{(j)}$ and $K_i^{(j)}$ are coefficients of the source-destination node channel and the source-relay node channel, respectively, and are changed in pair depending upon the antenna at the source node. The source antenna selection method described by the above-mentioned expressions may be more simplified as follows.

Figure 2:
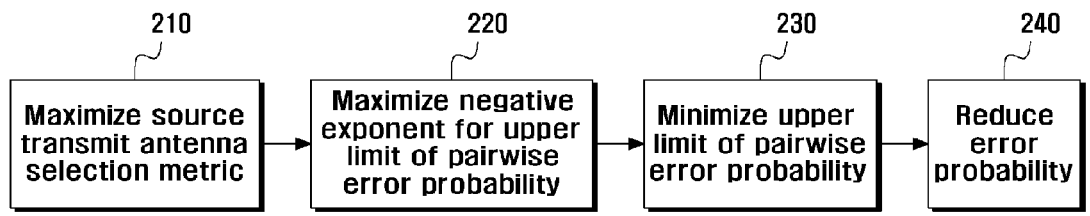
FIG. 2 illustrates a basic concept for a method of selecting a source transmit antenna in a cooperative MIMO communication system according to an exemplary embodiment of the present invention.

FIG. 2 illustrates a basic concept for a method of selecting a source transmit antenna in a cooperative MIMO communication system according to an exemplary embodiment of the present invention. In FIG. 2, the transmit antenna selection is described from the selection result in the reverse order of the description of the above-mentioned expressions.

In operation 210, an antenna is selected so as to maximize source transmit antenna selection metric which corresponds to the result derived from the exemplary embodiment of the invention.

In operation 220, a negative exponent for an upper limit of pairwise error probability is maximized. This may be easily understood by comparing the negative exponent in Expressions 1 and 2.

In operation 230, the upper limit of pairwise error probability is minimized according to Expression 1 if the negative exponent is maximized in the operation 220. As a result, in operation 240, the error probability is decreased.

Figure 3:
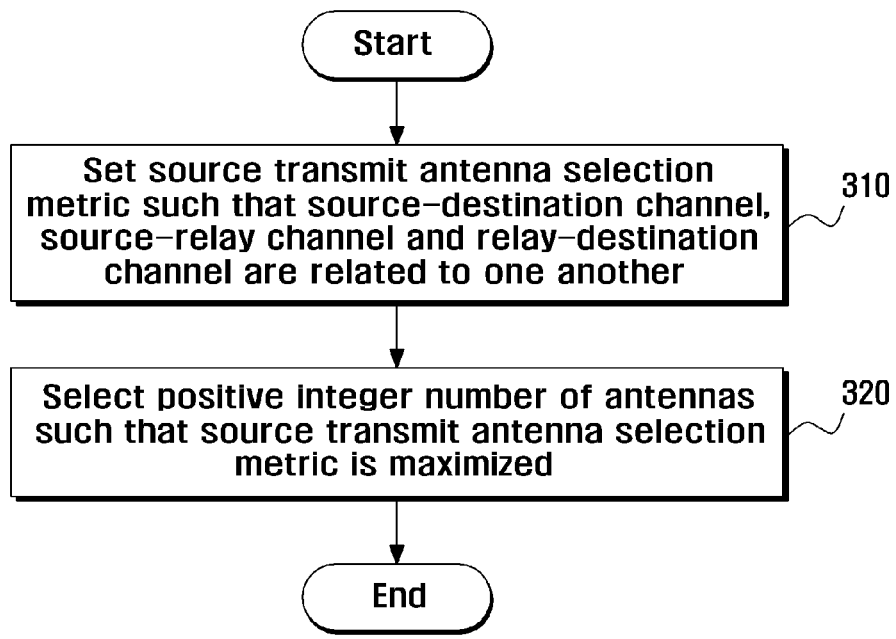
FIG. 3 is a flow chart illustrating a method of selecting a source transmit antenna in a cooperative MIMO communication system according to an exemplary embodiment of the present invention.

FIG. 3 is a flow chart illustrating a method of selecting a source transmit antenna in a cooperative MIMO communication system according to an exemplary embodiment of the present invention.

In operation 310, source transmit antenna selection metric is set such that a source-destination channel, a source-relay channel and a relay-destination channel are related to one another. The metric has been defined by Expression 2.

Specifically, it is preferable to set the source transmit antenna selection metric using a minimum value of the sum of the square of each element of channels formed from the source antenna and the receive antennas of the destination node, a minimum value of the sum of the square of each element of channels formed from the source antenna and the receive antennas of the relay node, and a minimum value of the sum of the square of each element of channels formed from the relay node antenna and the receive antennas of the destination node.

In operation 320, a positive integer number of antennas is selected to maximize the source transmit antenna selection metric which is set in the operation 310. That is, in operation 320, it is preferable to select antennas as many as the number of RF chains from among antennas included in the cooperative MIMO communication system such that the upper limit of pairwise error probability in the decode-and-forward cooperative communication system may be minimized. In this case, the upper limit of pairwise error probability has a negative exponent. The negative exponent is maximized if the source transmit antenna selection metric set in the operation 310 is maximized. Consequently, the upper limit of pairwise error probability is minimized.

Further, in the cooperative MIMO communication system shown in FIG. 3, the source node may transmit a code word to the relay nodes and the destination node for a first time slot, and the relay nodes may decode the signal received from the source node for a second time slot and transmit the decoded word to the destination word using an orthogonal channel.

The source transmit antenna selection metric defined in Expression 2 corresponds to general code words $X_S$ and $X_R$, which may be simplified in the following embodiments.

In a first embodiment, suppose that a single antenna is selected at the source node and an encoding is not performed. In this case, the source transmit antenna selection metric set in Expression 2 is expressed by Expression 3:

$$\Gamma_j = P_S\|G^{(j)}\|^2 + \sum_{i=1}^{N}\min\left[\frac{P_S}{2}\|K_i^{(j)}\|^2, P_R\min_{x,\check{x}\neq x}\|F_i(X_R(x)-X_R(\check{x}))\|^2\right] \quad (3)$$

In this case, the present embodiment selects a single antenna to maximize the source transmit antenna selection metric set in Expression 3.

In a second embodiment, suppose that a single antenna is selected at each of the source node and the relay node and an encoding is not performed. In this case, the source transmit antenna selection metric set in Expression 2 is expressed by Expression 4:

$$\Gamma_j = P_S\|G^{(j)}\|^2 + \sum_{i=1}^{N}\min\left[\frac{P_S}{2}\|K_i^{(j)}\|^2, P_R\|F_i\|^2\right] \quad (4)$$

In this case, the present embodiment selects a single antenna to maximize the source transmit antenna selection metric set in Expression 4.

In a third embodiment, suppose that both the source node and the relay node use orthogonal space-time code. In this case, the orthogonal space-time code may be Alamouti code, and the source transmit antenna selection metric set in Expression 2 is expressed by Expression 5:

$$\Gamma_j = P_S\|G^{(j)}\|^2 + \sum_{i=1}^{N}\min\left[\frac{P_S}{2}\|K_i^{(j)}\|^2, P_R\|F_i\|^2\right] \quad (5)$$

In this case, the present embodiment selects two antennas to maximize the source transmit antenna selection metric set in Expression 5.

As discussed above, the present embodiments describe new source transmit antenna selection methods in the decode-and-forward cooperative communication system. It has been experimentally shown that these methods may yield a lower error probability than a conventional method. Experiment results will be shown with reference to FIGS. 4 to 6.

Figure 4:
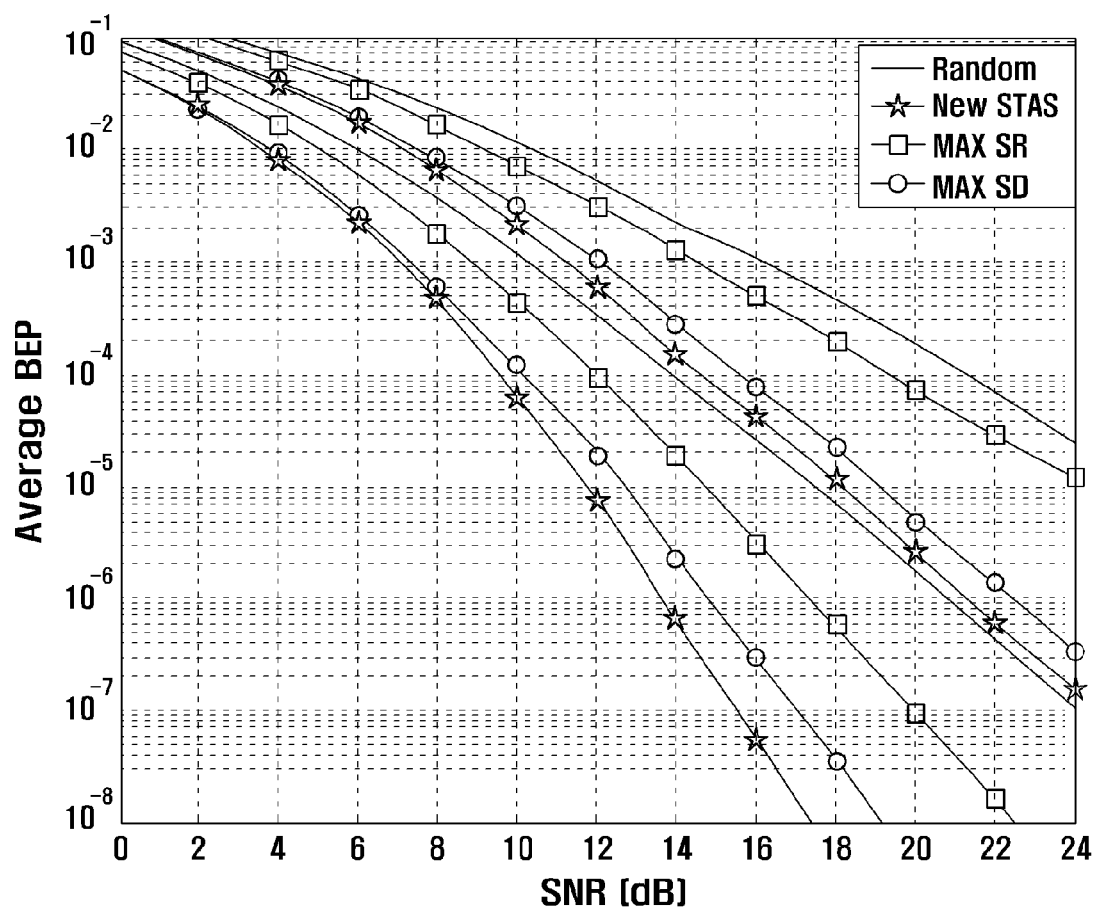
FIG. 4 illustrates experimental results when a single antenna is selected at a source node in accordance with a method of selecting a source transmit antenna in a cooperative MIMO communication system according to an exemplary embodiment of the present invention.

FIG. 4 illustrates experimental results when a single antenna is selected at a source node in accordance with a method of selecting a source transmit antenna according to an embodiment of the invention. FIG. 4 shows a source transmit antenna selection method of a cooperative communication system where one relay is present. In FIG. 4, $M_S$=2, $M_A$=1, $M_R$=2, $M_D$=1 for a solid line, and $M_D$=2 for a dotted line.

It can be seen from FIG. 4 that if a single antenna is selected at a source node, the source transmit antenna selection method is better in performance than a conventional method which is configured to select an antenna with an optimum source-relay channel or an optimum source-destination channel. Specifically, with respect to average bit error probability, when the number of antennas of the destination node, $M_D$, is equal to 1, the present source transmit antenna selection method has power gains of 1 dB and 5 dB more than conventional methods and also has a gain of about 6.5 dB more than a random selection method. It can also be seen from FIG. 4 that for $M_D$=2, the present source transmit antenna selection method has power gains of 0.7 dB and 2.7 dB more than the conventional methods and also has a power gain of about 4.6 dB more than the random selection method.

Figure 5:
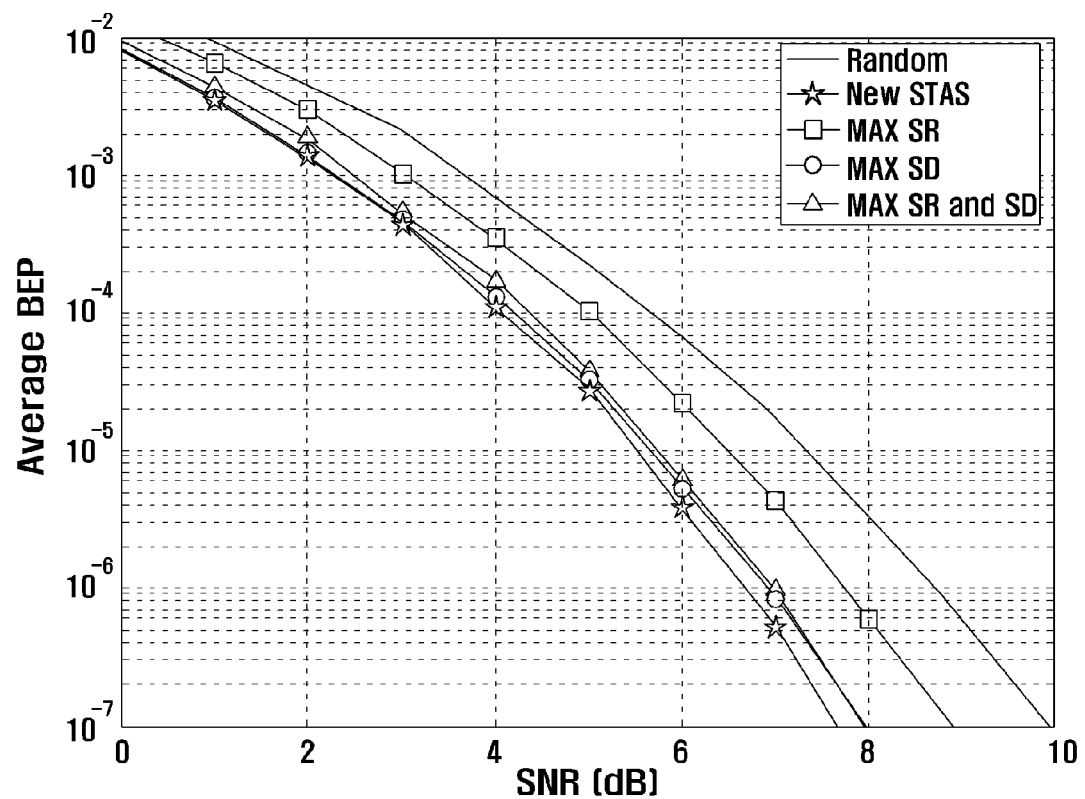
FIG. 5 illustrates experimental results when two antennas are selected at a source node in accordance with a method of selecting a source transmit antenna in a cooperative MIMO communication system according to an exemplary embodiment of the present invention.

FIG. 5 illustrates experimental results when two antennas are selected at a source node in accordance with a method of selecting a source transmit antenna according to an exemplary embodiment of the present invention. FIG. 5 shows a source transmit antenna selection method of a cooperative communication system where one relay is present. In FIG. 5, $M_S$=4, $M_A$=2, $M_R$=2, and $M_D$=4, and the source node and the relay node use Alamouti code.

It can also be seen from FIG. 5 that the source transmit antenna selection method is better in performance than a conventional method. Specifically, with respect to a bit error probability of $10^{-6}$, the present source transmit antenna selection method has power gains of 0.3 dB, 0.4 dB and 1.2 dB more than a conventional method of maximizing a source-relay channel, a conventional method of maximizing a source-destination channel, and a conventional method of maximizing a source-relay channel and a source-destination channel, respectively, and also has a power gain of 2.2 dB more than a random selection method.

Figure 6:
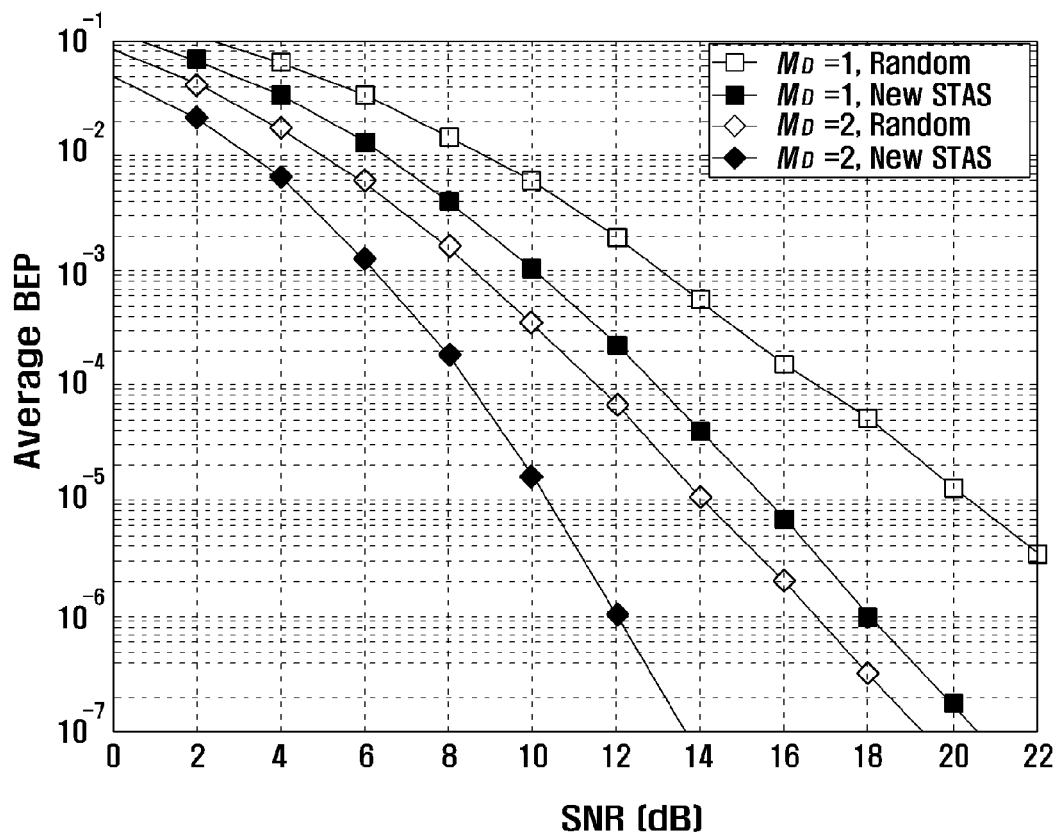
FIG. 6 illustrates experimental results when one of two antennas is selected and used at a source node in a cooperative MIMO communication system having two relays according to an exemplary embodiment of the present invention.

FIG. 6 illustrates experimental results when one of two antennas is selected and used at a source node in a cooperative MIMO communication system having two relays according to an exemplary embodiment of the present invention. That is, FIG. 6 shows experimental results of the source transmit antenna selection method when only one of two antennas is selected and used at a source node in a cooperative MIMO communication system having two relays according to an exemplary embodiment of the present invention. In FIG. 6, $M_S$=2 and $M_R$=1. It can be seen from FIG. 6 that the present source transmit antenna selection method has a power gain of about 4 dB more than a random selection method.

The present invention can be implemented as computer readable code in a computer readable recording medium. The computer readable recording medium is intended to include all types of recording media in which computer readable data are stored.

Examples of such computer readable recording media include ROMs, RAMs, CD-ROMs, magnetic tapes, floppy disks, and optical data storages. Further, the recording medium may be implemented in the form of a carrier wave, such as Internet transmission. In addition, the computer readable recording medium may be distributed to computer systems over a network, in which computer readable code may be stored and executed in a distributed manner. Computer readable functional programs, code and code segments for implementing the present invention may be easily inferred by computer programmers skilled in the art.

As is apparent from the above description, by selecting an antenna so as to maximize source transmit antenna selection metric set for a source-destination channel, a source-relay channel and a relay-destination channel to be related to one another, accurate performance standards can be presented. By performing communication through a selected antenna according to the performance standards, it is possible to lower an error probability and reduce power consumption. In addition, by extending a selected number of antennas and a method-thereof, it is possible to be applied to a multi-relay system. That is, the source transmit antenna selection method may also be applied to a multi-relay system by making it possible to select any number of antennas as well as one or two antennas at the source node.

The present invention has been described herein with reference to the foregoing embodiments. Those skilled in the art will appreciate that the present invention may be practiced otherwise than as specifically described herein without changing the essential features of the present invention. Therefore, it should be noted that the forgoing embodiments are merely illustrative in all aspects and are not to be construed as limiting the invention. The scope of the invention is defined by the appended claims rather than the detailed description of the invention. All modifications made within the scope of the claims should be construed as falling within the scope of the invention.

What is claimed is:

1. A method for selecting a source transmit antenna in a cooperative multiple-input and multiple-output (MIMO) communication system comprising a source node, a relay node and a destination node, the method comprising:
    setting a source transmit antenna selection metric such that a source-destination channel, a source-relay channel and a relay-destination channel are related to one another; and
    selecting a positive integer number of antennas such that the source transmit antenna selection metric is maximized,
    wherein the source transmit antenna selection metric is set using a minimum value of a sum of square of each element of channels formed from a source node antenna and receive antennas of a destination node, a minimum value of a sum of square of each element of channels formed from a source node antenna and receive antennas of a relay node, and a minimum value of a sum of square of each element of channels formed from a relay node antenna and receive antennas of a destination node.

2. The method of claim 1, wherein the source transmit antenna selection metric is $$\Gamma_j = P_S \min_{\substack{\vee \\ x, x \neq \tilde{x}}} \|G^{(j)}(X_S(x) - X_S(\tilde{x}))\|^2 +$$

$$\sum_{i=1}^{N} \min \left[ \begin{array}{l} \frac{P_S}{2} \min_{\substack{\vee \\ x, x \neq \tilde{x}}} \|K_i^{(j)}(X_S(x) - X_S(\tilde{x}))\|^2, \\ P_R \min_{\substack{\vee \\ x, x \neq \tilde{x}}} \|F_i(X_R(x) - X_R(\tilde{x}))\|^2 \end{array} \right]$$

where $P_s$ denotes an average transmit power of the source node, $P_R$ denotes an average transmit power of the relay node, $X_s$ denotes a code word, $G^j$ denotes a source-destination channel, $K^j$ denotes a source-relay channel, and F denotes a source-destination channel.

3. The method of claim 1, wherein the selecting of a positive integer number of antennas comprises selecting antennas as many as a number of RF chains from among antennas included in the cooperative MIMO communication system such that an upper limit of pairwise error probability of a decode-and-forward cooperative communication system is minimized.

4. The method of claim 3, wherein the upper limit of pairwise error probability has a negative exponent, and when the source transmit antenna selection metric is maximized, the negative exponent is maximized and the upper limit of pairwise error probability is minimized.

5. The method of claim 3, wherein the upper limit of pairwise error probability is $$P(x \to \tilde{x}) \leq 2(M^L+1)^N \exp\left(-\frac{1}{4\sigma^2}P_S\|G(X_S(x)-X_S(\tilde{x}))\|^2\right)$$

$$\exp\left(-\frac{1}{4\sigma^2}\sum_{i=1}^{N}\min\left[\begin{array}{c}\frac{P_S}{2}\min_{\check{x}\neq x}\|K_i(X_S(x)-X_S(\check{x}))\|^2, \\ P_R\min_{\check{x}\neq x}\|F_i(X_R(x)-X_R(\check{x}))\|^2\end{array}\right]\right).$$

6. The method of claim 1, wherein the source node transmits a code word to the relay nodes and the destination node for a first time slot, and the relay nodes decode a signal received from the source node for a second time slot and transmit the decoded word to the destination node using an orthogonal channel.

7. The method of claim 1, wherein if one antenna is selected at the source node and an encoding is not performed, the source transmit antenna selection metric is expressed by the following equation:

$$\Gamma_j = P_S\|G^{(j)}\|^2 + \sum_{i=1}^{N}\min\left[\frac{P_S}{2}\|K_i^{(j)}\|^2, P_R\min_{x,\check{x}\neq x}\|F_i(X_R(x)-X_R(\check{x}))\|^2\right],$$

and the selecting of a positive integer number of antennas is performed by selecting one antenna to maximize the source transmit antenna selection metric.

8. The method of claim 1, wherein if one antenna is selected at each of the source node and the relay node and an encoding is not performed, the source transmit antenna selection metric is expressed by the following equation:

$$\Gamma_j = P_S\|G^{(j)}\|^2 + \sum_{i=1}^{N}\min\left[\frac{P_S}{2}\|K_i^{(j)}\|^2, P_R\|F_i\|^2\right],$$

and the selecting of a positive integer number of antennas is performed by selecting one antenna to maximize the source transmit antenna selection metric.

9. The method of claim 1, wherein if an orthogonal space-time code is used at both the source node and the relay node, the source transmit antenna selection metric is expressed by the following equation:

$$\Gamma_j = P_S\|G^{(j)}\|^2 + \sum_{i=1}^{N}\min\left[\frac{P_S}{2}\|K_i^{(j)}\|^2, P_R\|F_i\|^2\right],$$

and the selecting of a positive integer number of antennas is performed by selecting two antennas to maximize the source transmit antenna selection metric.

10. The method of claim 9, wherein the orthogonal space-time code is Alamouti code.

11. A computer program product comprising at least one non-transitory computer-readable storage medium having computer-executable program code portions stored therein, the computer-executable program code portions comprising program code instructions for:

setting a source transmit antenna selection metric such that a source-destination channel, a source-relay channel and a relay-destination channel are related to one another; and selecting a positive integer number of antennas such that the source transmit antenna selection metric is maximized, wherein the source transmit antenna selection metric is set using a minimum value of a sum of square of each element of channels formed from a source node antenna and receive antennas of a destination node, a minimum value of a sum of square of each element of channels formed from a source node antenna and receive antennas of a relay node, and a minimum value of a sum of square of each element of channels formed from a relay node antenna and receive antennas of a destination node.

12. A method for selecting a source transmit antenna in a cooperative multiple-input and multiple-output (MIMO) communication system comprising a source node, a relay node and a destination node, the method comprising:

setting a source transmit antenna selection metric such that a source-destination channel, a source-relay channel and a relay-destination channel are related to one another; and selecting a positive integer number of antennas such that the source transmit antenna selection metric is maximized, wherein the source transmit antenna selection metric is $$\Gamma_j = P_S\min_{x,\check{x}\neq x}\|G^{(j)}(X_S(x)-X_S(\check{x}))\|^2 +$$

$$\sum_{i=1}^{N}\min\left[\frac{P_S}{2}\min_{x,\check{x}\neq x}\|K_i^{(j)}(X_S(x)-X_S(\check{x}))\|^2,\right.$$

$$\left. P_R\min_{x,\check{x}\neq x}\|F_i(X_R(x)-X_R(\check{x}))\|^2\right]$$

where $P_s$ denotes an average transmit power of the source node, $P_R$ denotes an average transmit power of the relay node, $X_s$ denotes a code word, $G^j$ denotes a source-destination channel, $K^j$ denotes a source-relay channel, and F denotes a source-destination channel.

* * * * *